US006574086B2

(12) United States Patent
Noll

(10) Patent No.: US 6,574,086 B2
(45) Date of Patent: Jun. 3, 2003

(54) STATIC ELIMINATOR EMPLOYING DC-BIASED CORONA WITH EXTENDED STRUCTURE

(75) Inventor: Charles G. Noll, Sellersville, PA (US)

(73) Assignee: Illinois Tool Works Inc., Gleview, IL (US)

( * ) Notice: Subject to any disclaimer, the term of this patent is extended or adjusted under 35 U.S.C. 154(b) by 23 days.

(21) Appl. No.: 09/863,161

(22) Filed: May 23, 2001

(65) Prior Publication Data

US 2002/0047713 A1 Apr. 25, 2002

Related U.S. Application Data

(60) Provisional application No. 60/211,599, filed on Jun. 15, 2000.

(51) Int. Cl.[7] ........................... H01H 47/32; H01G 3/00

(52) U.S. Cl. ....................... 361/229; 361/212; 361/213; 361/220; 361/226

(58) Field of Search ........................... 324/464; 378/64; 361/213, 212, 226, 220, 229; 95/65; 250/283

(56) References Cited

U.S. PATENT DOCUMENTS 3,626,182 A * 12/1971 Cohen ........................ 250/283
4,132,567 A * 1/1979 Blackwood .................... 134/1
4,259,707 A * 3/1981 Penney ....................... 361/212
5,017,876 A * 5/1991 Wright et al. ............... 324/464
5,249,094 A * 9/1993 Hayakawa et al. ......... 361/229
5,296,018 A * 3/1994 Suzuki .......................... 95/65
5,719,739 A * 2/1998 Horiguchi ................... 361/220
5,847,917 A * 12/1998 Suzuki ....................... 361/213
5,883,934 A 3/1999 Umeda ......................... 378/64
5,982,102 A 11/1999 Andrzej ................... 315/111.9
6,259,591 B1 * 6/2000 Pitel et al. .................. 361/212
6,407,382 B1 * 6/2000 Spangler ..................... 250/286

FOREIGN PATENT DOCUMENTS

WO WO 00/38484 A1 6/2000
WO WO 01/09999 A1 2/2001

* cited by examiner

*Primary Examiner*—N. Le
*Assistant Examiner*—Wasseem H. Hamdan
(74) *Attorney, Agent, or Firm*—Akin, Gump, Strauss, Hauer & Feld, L.L.P.

(57) ABSTRACT

An ionizer creates a corona current distribution having a balanced flow of positive and negative ions in a variable ion mobility gaseous environment. The balanced flow of positive and negative ions are directed toward a workspace or target located in the gaseous environment and downstream from the ionizer. The ionizer includes a corona electrode, a counterelectrode, a corona-free dc bias electrode, and a control circuit. The corona electrode has a negative polarity. The counterelectrode has an ion collecting surface. The corona-free dc bias electrode has a positive polarity. The control circuit controls the output of the corona-free electrode so as to cause a balanced flow of positive and negative ions to be emitted from the ionizer and directed towards the workspace or target. In this manner, a static-free environment is created at the workspace or target.

11 Claims, 9 Drawing Sheets

STATIC ELIMINATOR EMPLOYING DC-BIASED CORONA WITH EXTENDED STRUCTURE

CROSS-REFERENCE TO RELATED APPLICATIONS

This application claims the benefit of U.S. Provisional Application No. 60/211,599 entitled "STATIC ELIMINATOR EMPLOYING DC-BIASED CORONA WITH EXTENDED STRUCTURE," filed Jun. 15, 2000.

BACKGROUND OF THE INVENTION

The present invention falls into a class of technology and methods where gasborne charge-carriers are used to neutralize a charge imbalance on insulating materials and floating conductors. The methods are applied in general industry for static elimination to reduce hazardous and nuisance static discharges and improve process operations and cleanliness.

Electrical static eliminators are used in many industries to control unbalanced charges on insulating materials and floating conductors. FIG. 1 shows one example of a prior art static eliminator system including positive and negative polarity corona ionizers 1, their environment 10, and a target 11. When the ionizers 1 are distant from the target 11, gas flow 7 is used to convey the products of ionization to the target. The corona ionizers 1 can be separate dc or pulsed-dc emitters, or single emitters with alternating potential to separate the positive and negative polarity corona in time.

The make-up of ions from a typical ionizer is very complex and is far from understood. Many species are short-lived, and often highly reactive. Most ionic species discussed in the literature are found in the interelectrode gap, after ion molecule reactions have had time to develop. The ions and their distribution also depend on the corona mode (e.g. glow or pulsed) that is active for the electrode geometry, the gas, and the potential.

The carriers entrained from a corona by gas flow are only beginning to be explored. However, it is becoming clear that only about 0.1% of carriers generated in a corona are entrained, and the control of these carriers is not achieved by trivial adjustment of positive and negative corona currents.

Conventional charge eliminators produce gasborne charge-carriers of positive and negative polarity, so that the charge needed for static elimination is attracted from the gas to charged articles. The equipment includes nozzles, blowers, and room ionization systems where charged carriers are conveyed from electrical corona to articles to be neutralized. Other ionizers are simply placed in chambers where gas circulation conveys the charge-carriers to electrostatically charged articles, or are static bars fitted with air knives or tubes perforated with an array of orifices. The corona ionizers can consist of separate positive or negative polarity charge-carrier generators for direct current (continuous or pulsed) ionization. Alternatively, the ionizers can be single emitters or arrays of these emitters operated at alternating polarity.

A noted deficiency with conventional ionizers is that they do not perform well in nitrogen, hydrogen, and noble (inert) gases, because control is difficult where the gases are non-electron attaching. These ionizers also use corona electrodes with two separate polarities or alternating polarity.

Nitrogen is used to inert processes in many industries, and can purge areas cooled by the evaporation of liquid nitrogen. In recent years, static eliminators using nuclear (radioisotope), ultraviolet, soft x-ray, and corona discharge ionizers have been explored for use in nitrogen environments. Nitrogen, hydrogen, and the noble gases pose special problems for electrical static eliminators, since the negative carriers formed in the negative corona discharge are free electrons and these do not readily attach to atomic or molecular nitrogen species. In industrial applications, where the impurity is not always well controlled, there will be some electron attachment, and the effective negative-carrier mobilities and negative polarity corona current can vary over great ranges without significant effect and control on carrier entrainment. The mobility effect is also influenced by temperature.

In International PCT Publication No. WO 01/09999 entitled "IONIZER FOR STATIC ELIMINATION IN VARIABLE ION MOBILITY ENVIRONMENTS," designating the United States, now U.S. application Ser. No. 09/762,521, which is incorporated by reference herein, balanced static elimination is achieved in variable ion mobility environments using positive and negative polarity corona emitters. The balance, however, is more difficult to control in high purity nitrogen and at low temperatures where positive carrier generation must occur at higher electric fields where the ratio of negative to positive polarity emitter currents can exceed 1000 to 1.

Each of the alternative technologies (nuclear, UV, x-ray) produces positive ion and free electron pairs in nitrogen. The balance of these ionizers, however, is not easily controlled in air, let alone nitrogen gas and over the temperature range of interest (i.e. 200 degrees K to 450 degrees K). Also, the alternative ionizers can introduce radiation hazards to the work place. X-ray, radioactive and UV ionizers pose radiation hazards in the environment and typically need to be licensed or shielded for use in commercial applications. The corona type electrical ionizer, on the other hand, does not need to be licensed as a source of ionizing radiation, and operates in the current-limited mode throughout its useful life. The performance of the corona type electrical ionizer does not decay over time as will occur for at least the radioactive ionizer. The electrical ionizer is, therefore, preferred if its balance can be controlled.

Many static eliminators have been proposed for use in industrial environments. Some have claimed to be useful in nitrogen environments. U.S. Pat. No. 5,883,934 (Umeda) describes that imbalance in the entrained carriers from ionizers can be based on UV ionizer radiation brought into balance by a dc bias. The same is true for ionizers based on corona ionizer activity and other forms of ionizing radiation, such as UV and radioactive ionizers, which produce carrier pairs. Umeda, however, does not recognize the importance of carrier mobility in bringing about balance in gases such as nitrogen at low temperature. Thus, it is unlikely that balance of this ionizer can be controlled in a non-electron-attaching environment by the method proposed in the patent.

When positive and negative polarity corona emitters are used as the corona source, balance can be achieved by adjusting the potentials on the emitters. The ratio of currents from these emitters is shown in prior art FIG. 6 for gases 213 degrees K and 300 degrees K. The difficulty with the arrangement of prior art ionizers such as those discussed in WO 01/09999, is that the control point (residual potential=0) is achieved at large current ratios or is not achieved at all at lowest temperatures. The ratio of currents needed to achieve balance in nitrogen is shown in prior art FIG. 7 as a function of temperature. The method described in WO 01/09999 achieves the balance by operating the negative emitter at a high current (limited) condition and adding positive-polarity corona current as needed to balance the ionizer.

BRIEF SUMMARY OF THE INVENTION

The present invention departs from conventional technology by relying upon a single polarity corona to generate simultaneously both positive and negative carriers and to balance this ionization using a corona-free dc bias electrode to remove unwanted carriers. The invention is best practiced for use with a negative polarity corona. Negative polarity corona generally contains an extended corona structure that improves contact between positive and negative ions and gas flow, and is especially suited for use in nitrogen, hydrogen, and inert gas environments where there is an intense current-limited discharge. The choice of corona electrode polarity is driven by the higher mobility of the negative carriers and their relative abundance in the corona source.

Many balancing and self-balancing circuits have been developed for electrical ionizers in air, but few have been designed for use in variable ion mobility environments. The present invention offers improvement over existing balancing circuits in nitrogen environments, such as described in International PCT Publication No. WO 00/38484 entitled "GAS-PURGED IONIZERS AND METHODS OF ACHIEVING STATIC NEUTRALIZATION THEREOF." Unlike conventional balancing circuits based on two polarity corona systems, a single-polarity (negative) corona is controlled using a passive (corona-free) control element. The complicated interaction of two corona systems, which could separately have changing corona modes (morphology) is thereby avoided.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

I. Overview of Present Invention

Figure 1:
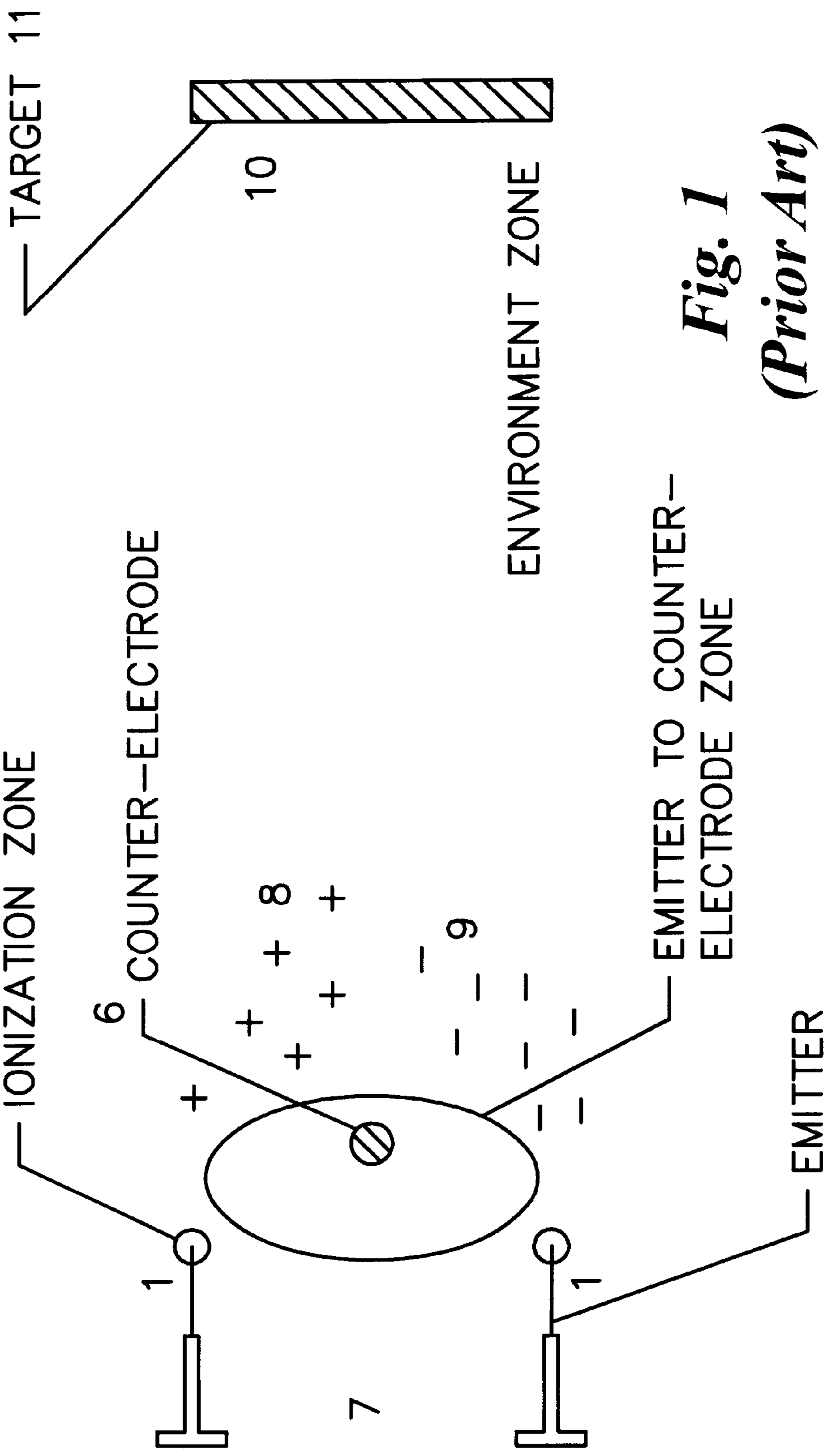
Fig. 1 (Prior Art)
FIG. 1 illustrates the general arrangement of a prior art electrical ionizer.
Figure 2:
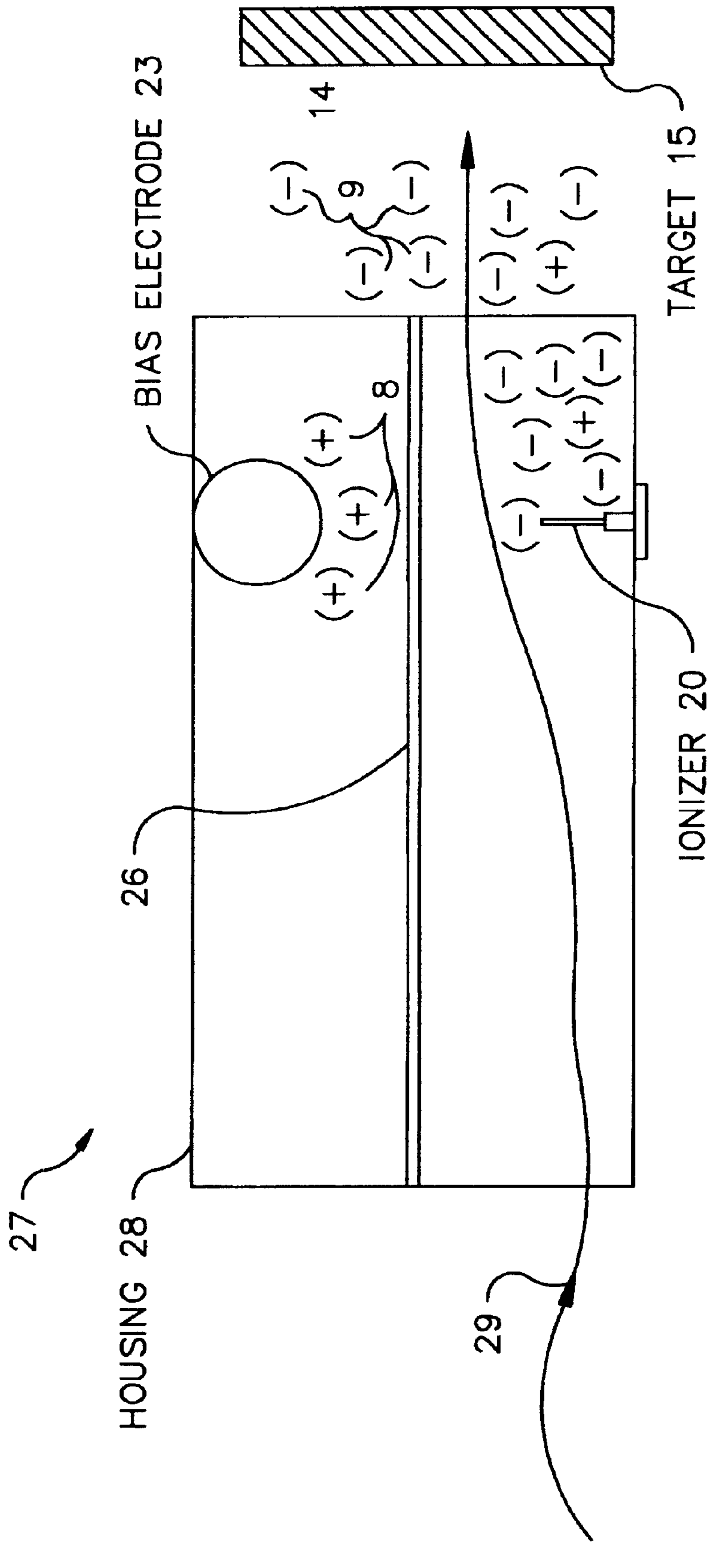
FIG. 2 is an ionizer in accordance with the present invention with point-to-plane electrode geometry.
Figure 4:
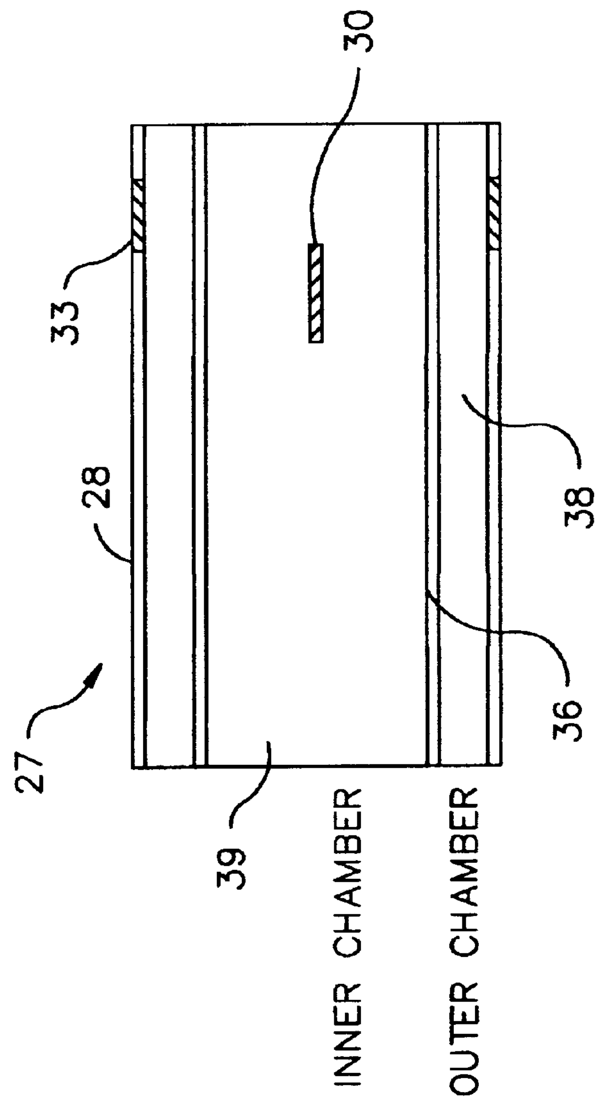
FIG. 4 is a side elevation view of an ionizer in accordance with the present invention with needle in tube electrode geometry.

FIG. 2 shows an ionizer 27 in accordance with one preferred embodiment of the present invention. The ionizer 27 creates a corona current distribution having a balanced flow of positive 8 and negative 9 ions in a variable ion mobility gaseous environment 29. The balanced flow of positive and negative ions is directed toward a workspace 14 or target 15 located in the gaseous environment 29 and downstream from the ionizer 27. The ionizer 27 has a housing 28, a corona electrode 20 of negative polarity, a counterelectrode 26 with an ion collecting surface; and a corona-free de bias electrode 23 of positive polarity. The ionizer 27 also has a control circuit 41, shown in FIG. 5, which controls the output of the corona electrode 20 as a current limited discharge so as to cause a balanced flow of positive and negative ions to be emitted from the ionizer 27 and directed towards the workspace 14 or target 15, thereby creating a static-free environment at the workspace 14 or target 15. The ionizer 27 may also have a control circuit 41 that controls the potential on the corona-free electrode 23.

The ionizer 27 may also comprise a corona electrode 20 that is an extended corona structure, thereby improving contact between positive and negative ions and gas flow. Charge-carriers of positive and negative polarity are entrained by gas flow through the negative polarity current limited discharge.

In one preferred embodiment illustrated in FIG. 2, the corona-free electrode 23 is spherically shaped. However, other shapes are within the scope of the invention, such as a wire or cylinder of sufficient diameter to prevent corona (where the curvature of the surface is sufficiently large to prevent corona).

FIG. 2 shows one embodiment of the ionizer 27 wherein the corona electrode 20 is arranged in a point geometry, the counterelectrode 26 is arranged in a plane geometry, and the corona-free electrode 23 is arranged in a point geometry on the opposing side of the counterelectrode 26 from the corona electrode 20.

Figure 3:
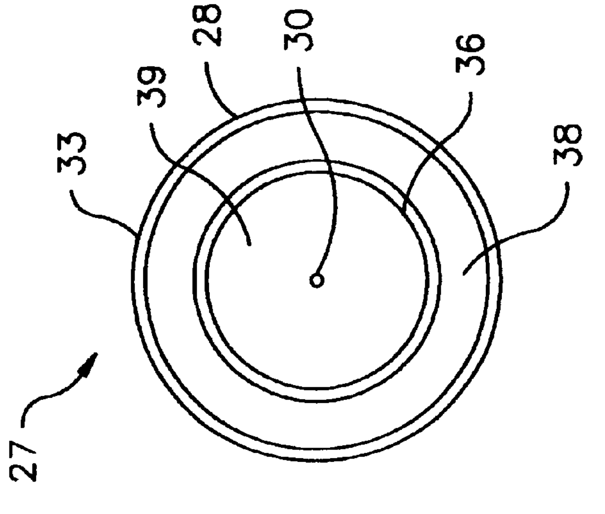
FIG. 3 is a sectional view of an ionizer in accordance with the present invention with needle-in-tube electrode geometry.

FIG. 3 shows another embodiment of the ionizer 27 wherein the corona electrode 30 is a needle electrode, the counterelectrode 36 is arranged in a ring or tube geometry about the corona electrode 30, and the corona-free electrode 33 is arranged in a ring or tube geometry about the counterelectrode 36. The ionizer has an inner chamber 39 defined by the counterelectrode 36 and an outer chamber 38 defined by the volume between the counterelectrode 36 and the housing 28.

Figure 5:
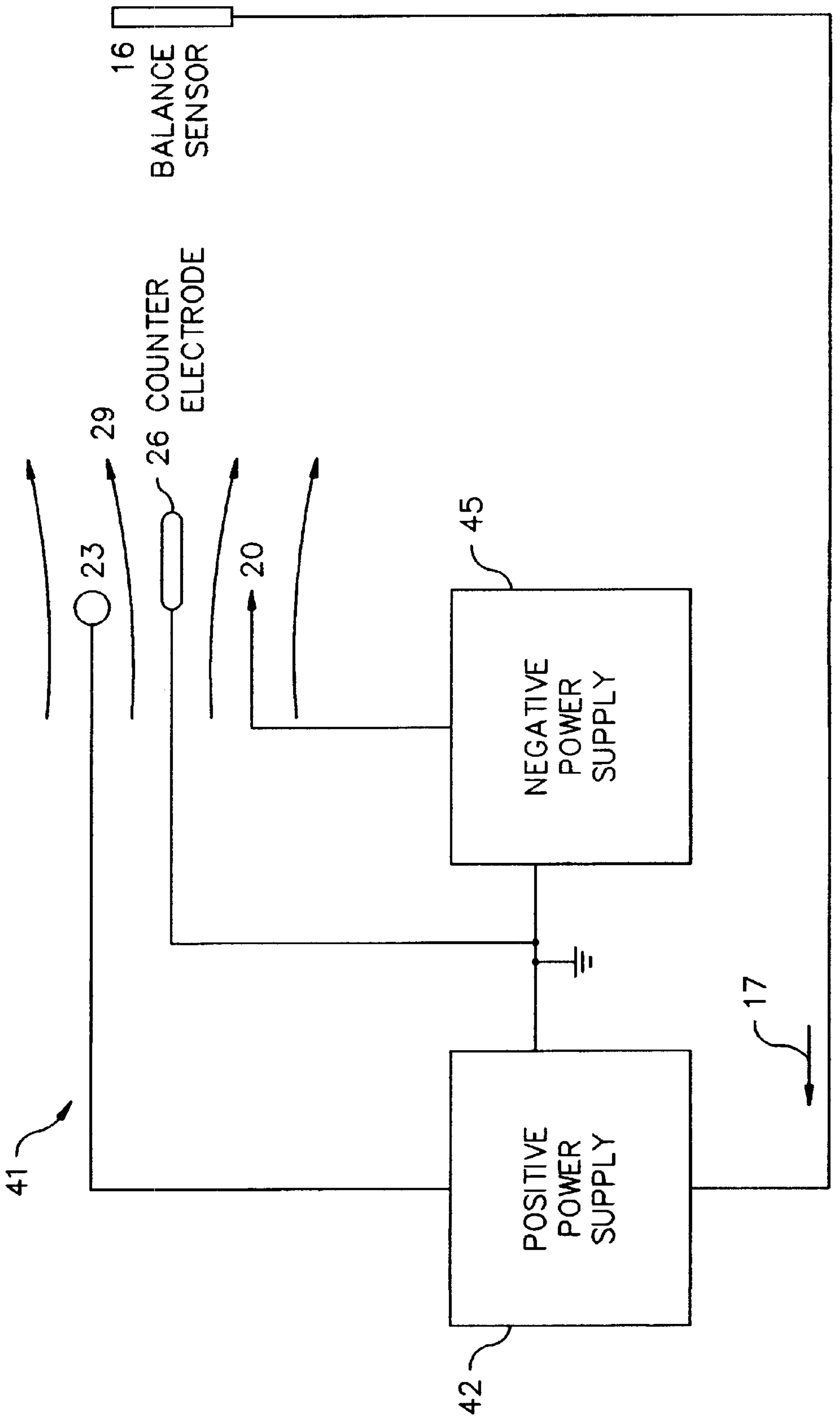
FIG. 5 is a functional schematic, of the power controls for the electrical ionizer of the present invention.
Figure 6:
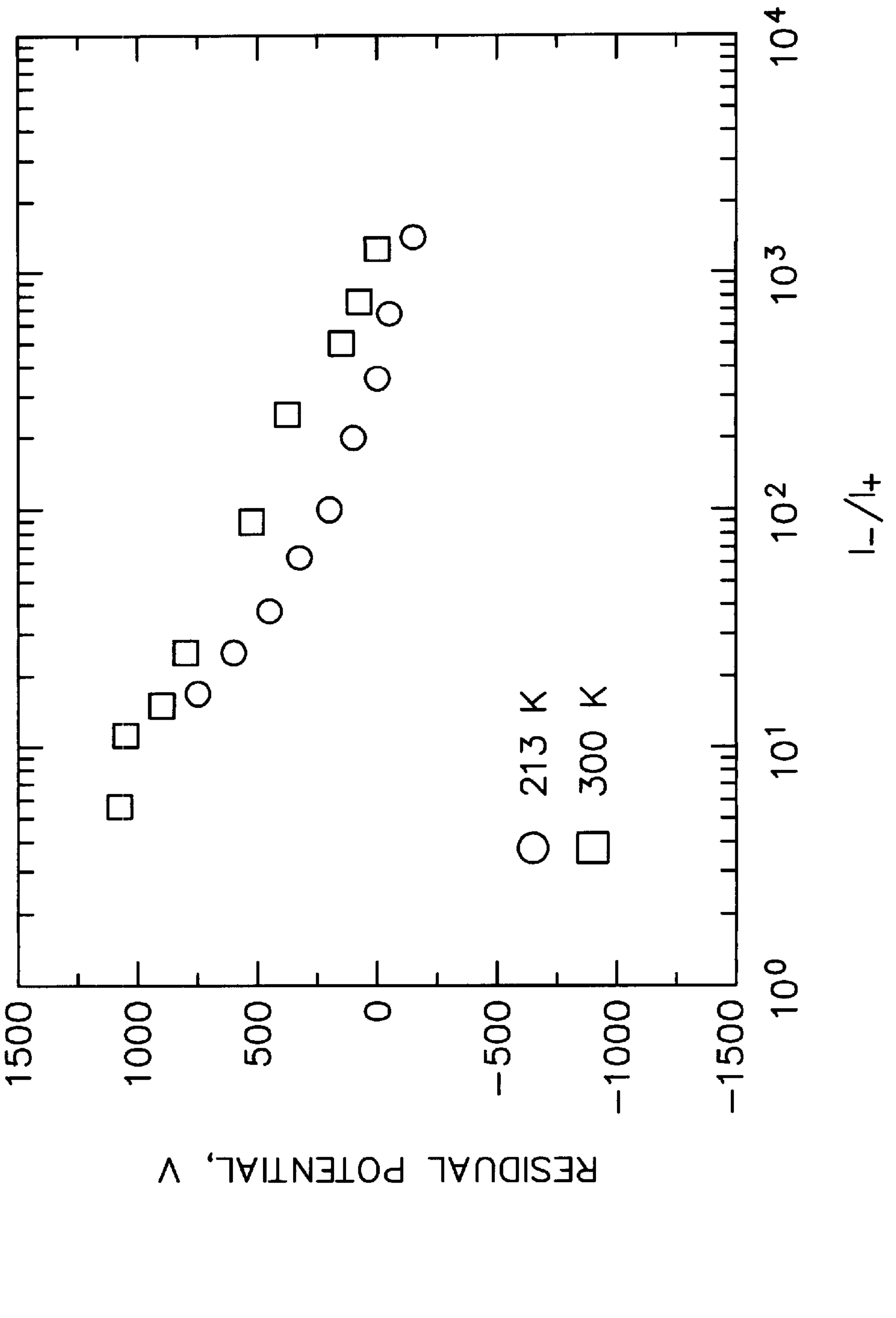
Fig. 6 (Prior Art)
FIG. 6 is a prior art graph which illustrates the balance control curves when positive and negative corona emitters are used as the corona source at 213 degrees K and 300 degrees K.
Figure 7:
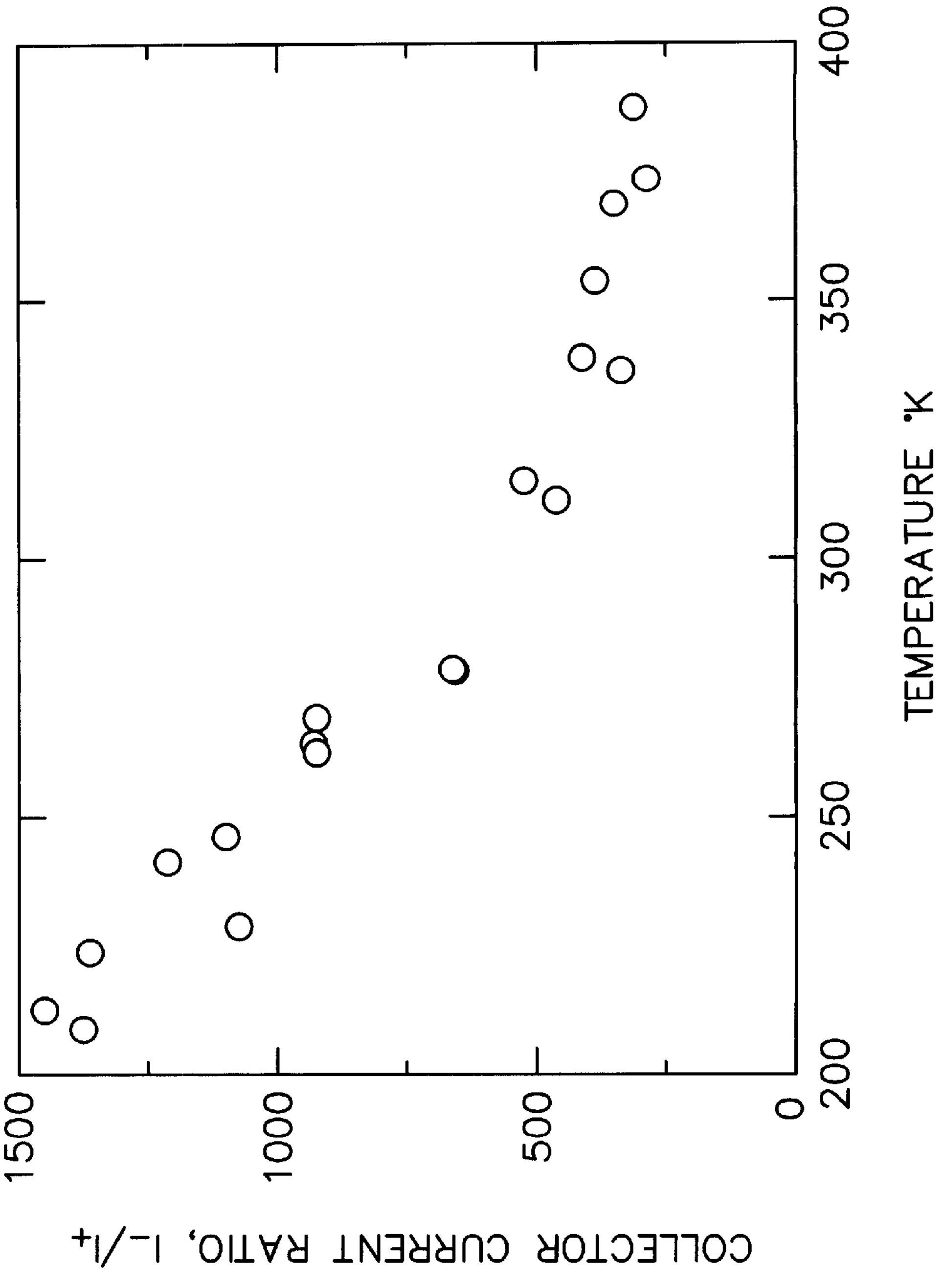
Fig. 7 (Prior Art)
FIG. 7 is a prior art graph which illustrates the ratio of emitter currents needed for balanced ionization in nitrogen as a function of temperature from 200 degrees K to 400 degrees K.

Referring to FIGS. 2 and 5, in operation, the ionizer 27 creates a balanced flow of positive and negative ions directed toward a workspace 14 or target 15 located in a variable ion mobility gaseous environment 29. The corona electrode 20 may be controlled with a fixed voltage potential, current limiting power supply 45 of negative polarity; and the corona-free electrode 23 may be controlled with a voltage controlled power supply 42 of positive polarity based on the output signal 17 of a balance sensor 16 located near the workspace 14 or target 15.

The ionizer 27 may be operated in the gaseous environment 29 when the variable ion mobility gaseous environment is substantially nitrogen, hydrogen, or a noble gas such as helium, neon, argon, krypton, xenon, or radon. The ionizer 27 may also be operated in the gaseous environment 29 when the variable ion mobility gaseous environment is between about 200 degrees Kelvin to about 450 degrees Kelvin.

II. Detailed Description

Referring again to FIG. 2, the present invention employs a single polarity corona to generate simultaneously both positive and negative carriers and to balance this ionization using a corona-free dc bias electrode to remove unwanted carriers. FIG. 5 shows a self-balancing circuit 41, for use with the present invention. The circuit 41 avoids the complications associated with the interaction of two corona systems.

The present invention is best practiced with a negative polarity corona, since negative polarity corona generally contains an extended structure. Extended discharge structures introduce both positive and negative polarity carriers to the gas stream. These extended structures include streamers, Trichel pulses, burst pulses, and sparks. Conversely, glow corona, such as Hermstein glow of positive corona, introduce positive carriers with few negative carriers. The difficulty with positive corona is that the glow corona can transition to a pre-breakdown streamer mode with a somewhat random onset condition. When this transition occurs, the positive corona will change from introducing positive carriers to introducing both positive and negative polarity carriers to the entrained flow. This transition will upset use of a conventional design, but is partially overcome in the method described in WO 01/09999.

The corona is produced by application of potential differences between electrodes. The resulting electric fields not only produce the corona, but also electric forces which remove charge-carriers from the gas stream. The small fraction of carriers (typically 0.1%) that are entrained with the gas flow is determined against this removing action. The difference in carrier mobility is also important, since more mobile carriers move faster in a given electric field and are more easily removed from the gas stream. This is especially true in nitrogen, where the negative carriers (free electrons) have mobilities from 100–1000 times greater than the positive carriers. At lower temperatures, higher electric fields are needed to initiate corona, and thus, stronger forces act to remove carriers from the gas stream. The large difference in carrier mobility in nitrogen and noble gases is used to their best advantage in the present invention.

The research has shown that negative polarity corona in nitrogen produces extended corona structures and the generation of positive and negative polarity carriers in the entrained gas stream. The negative polarity carriers in air, and especially in nitrogen, generally have higher mobility than the positive polarity carriers. For this reason, positive carriers are more likely to be entrained from the corona. In negative polarity corona, the positive carriers that are generated are typically closer to the high voltage electrode and in a higher field. The bias of the entrained carriers is negative for the negative polarity dc corona.

Figure 8:
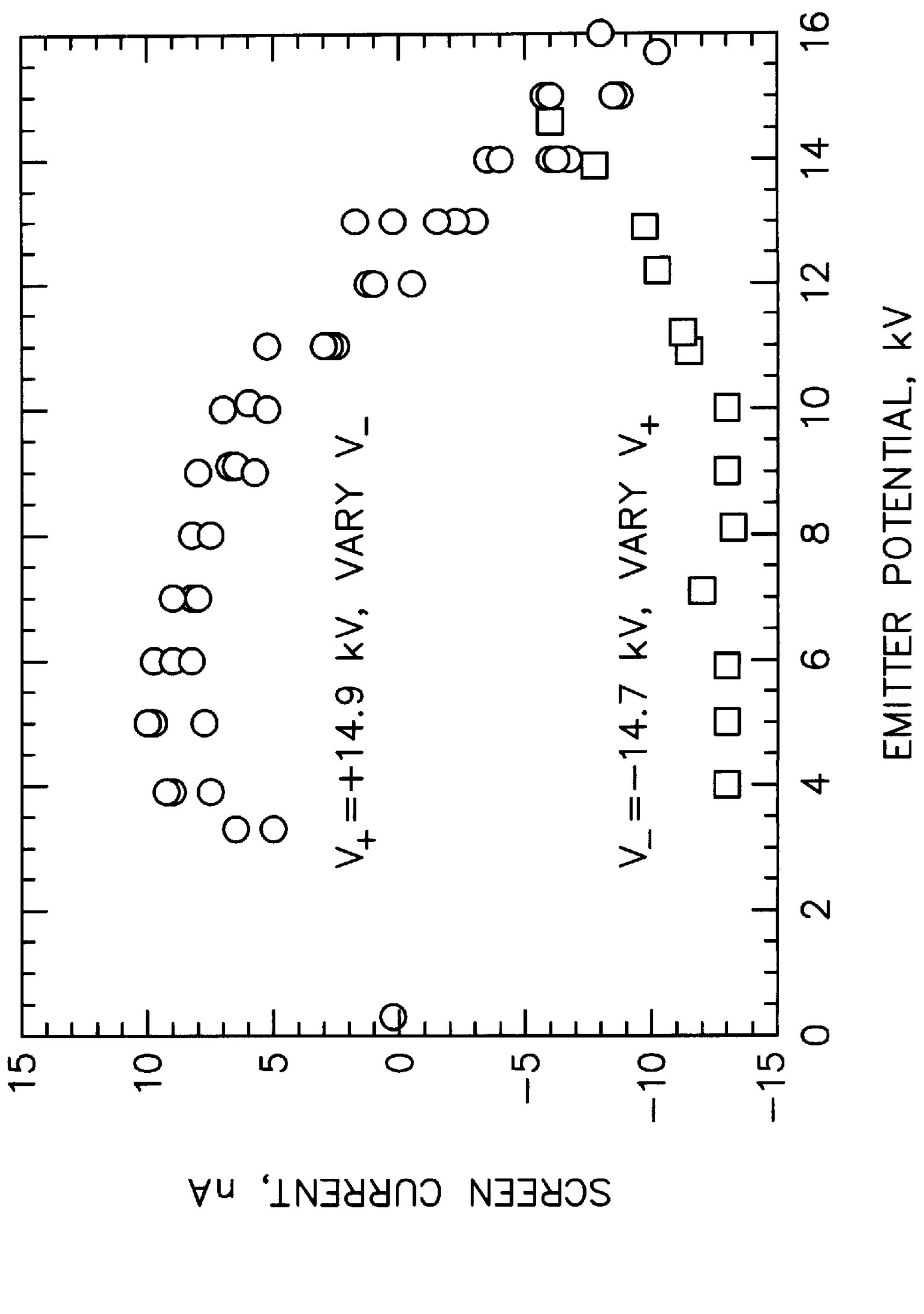
FIG. 8 is a graph which illustrates that a negative corona has a greater influence on target balance in air at 433 degrees K.

For conventional ionizers, including ionizers described in WO 01/09999, to be used in variable ion mobility environments, a positive polarity corona is used to inject positive carriers into the gas stream and provide an electric field to remove excess carriers and balance targets placed in the entrained carrier stream. The positive corona may inject some negative carriers, making balance more difficult. FIG. 8 shows that in air at 433 degrees K, a negative corona has a greater influence on target balance than a positive polarity corona, when the other polarity is operating at normal voltages.

When one emitter is replaced with the spherical target and a positive potential is placed on this electrode, the balance condition is not significantly affected in air. The charge concentrations are reduced by the bias field, and the charge extraction rates decrease. This is expected, because the positive and negative carriers have a similar mobility.

Figure 9:
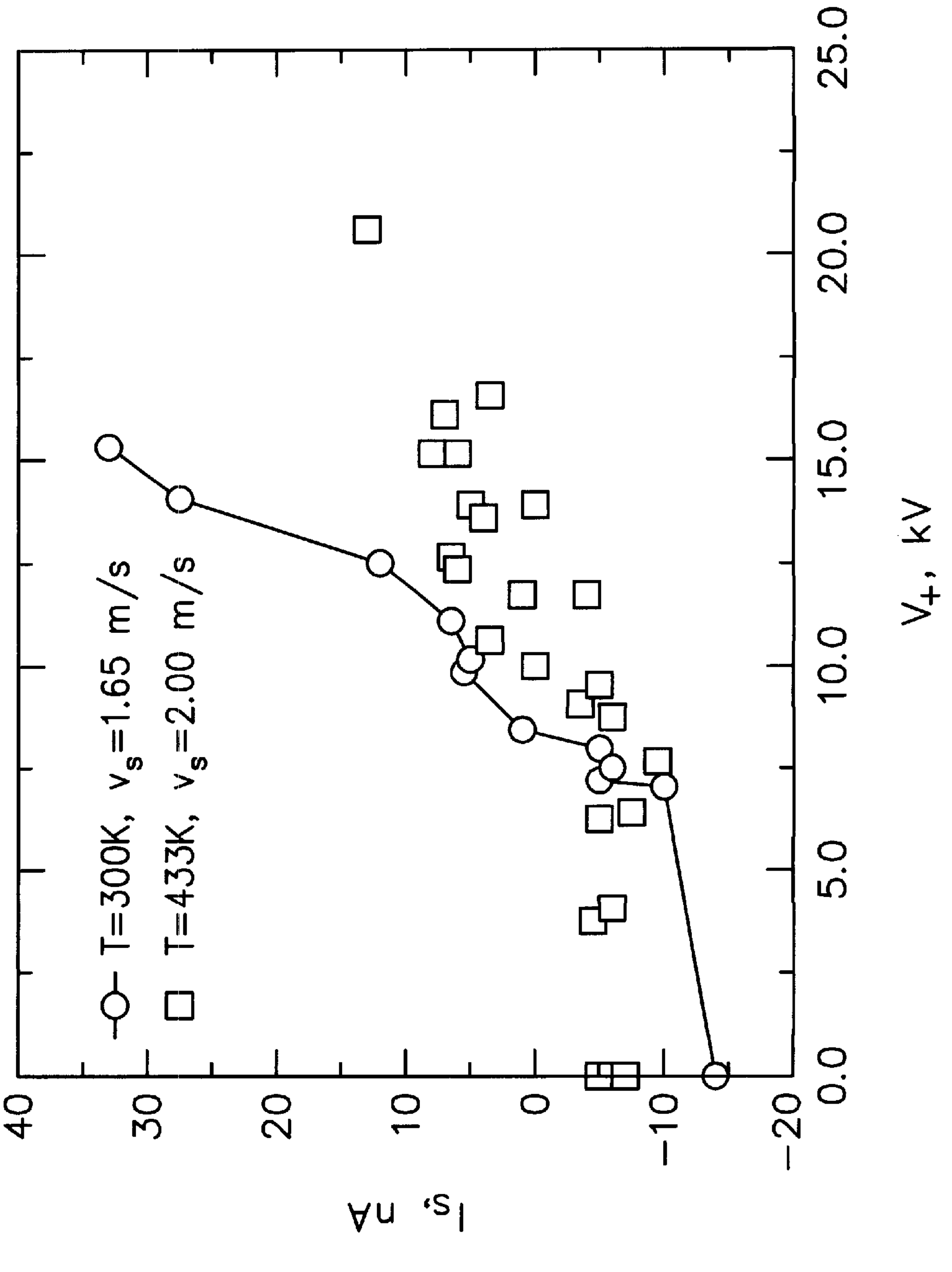
FIG. 9 is a graph which illustrates that a potential on a sphere does not add carriers to the entrained stream in nitrogen at 300 degrees K and 433 degrees K.
Figure 10:
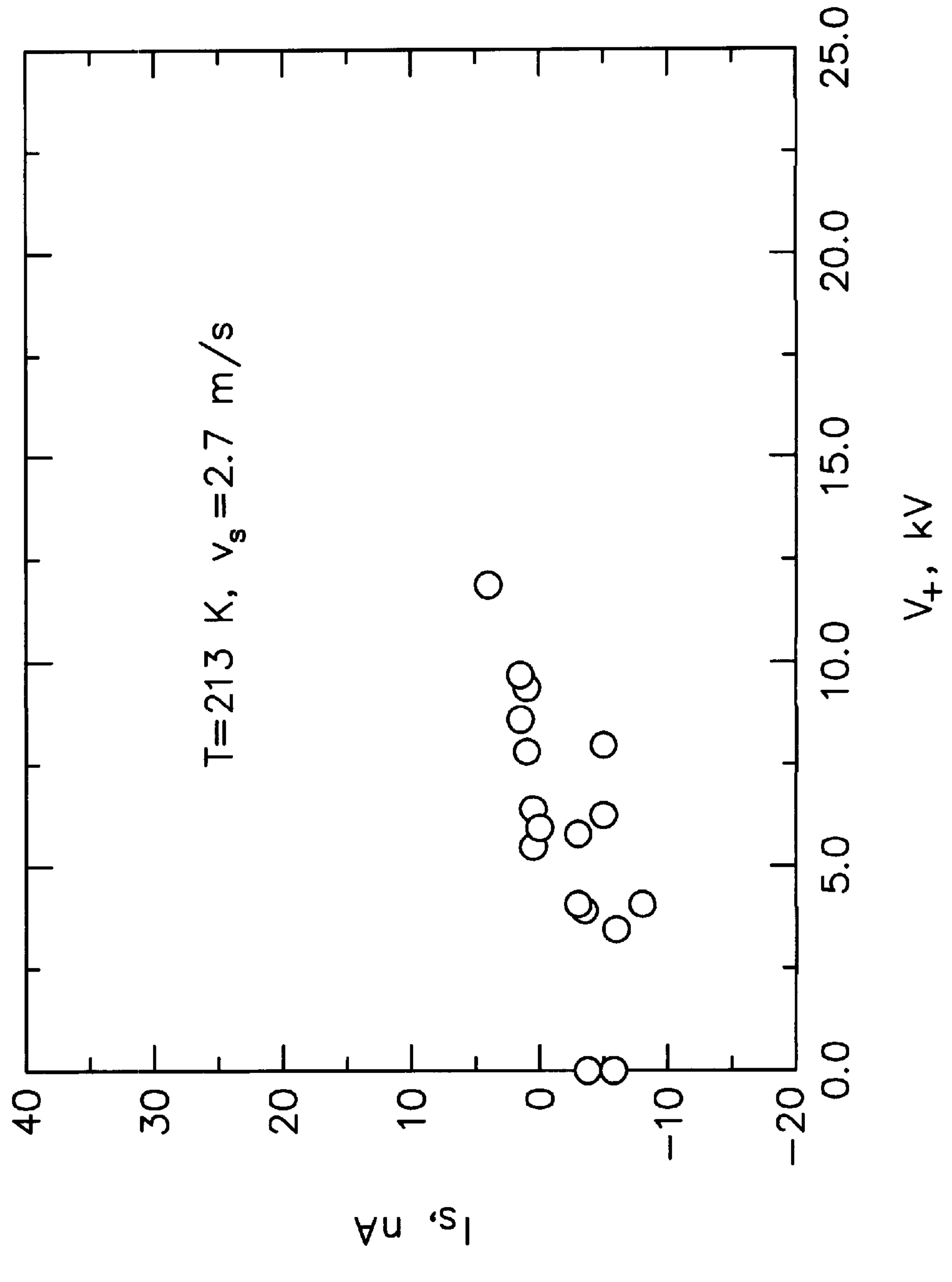
FIG. 10 is a graph which illustrates that a potential on a sphere does not add carriers to the entrained stream in nitrogen at 300 degrees K.

In nitrogen, a potential on the corona-free electrode, in this case a sphere, does not add carriers to the entrained stream, but preferentially removes mobile free electrons over positive carriers. This leads to a more easily established balance condition. This is shown in FIG. 9 for data at 300 degrees K and 433 degrees K. Similarly, FIG. 10 shows the balance control at 213 degrees K. Since the negative corona is generally an extended corona structure, the underlying negative corona process generates positive and negative polarity carriers that can be balanced by the corona free electrode at positive potential. This is an important feature of the present invention and has not previously been demonstrated in the known prior art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An ionizer which creates a corona current distribution having a balanced flow of positive and negative ions in a variable ion mobility gaseous environment, the balanced flow of positive and negative ions being directed toward a workspace or target located in the gaseous environment and downstream from the ionizer, the ionizer comprising:

(a) a corona electrode of negative polarity;

(b) a counterelectrode having an ion collecting surface and spaced apart from the corona electrode;

(c) a corona-free dc bias electrode of positive polarity spaced apart from the corona electrode and the counter electrode; and (d) a control circuit configured to control the output of at least one electrode so as to cause a balanced flow of positive and negative ions to be emiffed from the ionizer and directed towards the workspace or target, thereby creating a static-free environment at the workspace or target.

2. The ionizer of claim 1 wherein the corona electrode is an extended corona structure, thereby improving contact between positive and negative ions and gas flow.

3. The ionizer of claim 1 wherein the corona-free electrode is spherically shaped.

4. The ionizer of claim 1 wherein the corona electrode is arranged in a point geometry, the counterelectrode is arranged in a plane geometry, and the corona-free electrode is arranged in a point geometry on the opposing side of the counterelectrode from the corona electrode.

5. The ionizer of claim 1 wherein the corona electrode is a needle electrode, the counterelectrode is arranged in a ring or tube geometry about the corona electrode, and the corona-free electrode is arranged in a ring or tube geometry about the counterelectrode.

6. The ionizer of claim 1 wherein the control circuit controls the output of the corona-free electrode.

7. A method of creating a balanced flow of positive and negative ions, the balanced flow of positive and negative ions being directed toward a workspace or target, the method comprising:

(a) providing a variable ion mobility gaseous environment, the workspace or target being located in the gaseous environment;

(b) operating an ionizer in the gaseous environment to create corona current distribution, the workspace or target being located downstream from the ionizer, the ionizer including a corona electrode and a corona-free electrode;

(c) controlling the corona electrode with a fixed voltage potential current limiting power supply of negative polarity; and (d) controlling the corona-free electrode with a voltage controlled power supply of positive polarity based on the output signal of a balance sensor located near the workspace or target so as to cause a balanced flow of positive and negative ions to be emitted from the ionizer and directed towards the workspace or target, thereby creating a static-free environment at the workspace or target.

8. The method of claim 7 wherein the corona electrode is an extended corona structure, thereby improving contact between positive and negative ions and gas flow.

9. The method of claim 7 wherein the variable ion mobility gaseous environment provided in step (a) is substantially nitrogen.

10. The method of claim 7 wherein the variable ion mobility gaseous environment provided in step (a) is substantially a gas, selected from the group consisting of helium, hydrogen, neon, argon, krypton, xenon, or radon.

11. The method of claim 7 wherein the variable ion mobility gaseous environment provided in step (a) is between about 200 degrees Kelvin to about 450 degrees Kelvin.

* * * * *